United States Patent [19]

Kawamura

[11] Patent Number: 4,625,910
[45] Date of Patent: Dec. 2, 1986

[54] HEATER SYSTEM ASSOCIATED WITH ENGINE

[75] Inventor: Hideo Kawamura, Samukawa, Japan

[73] Assignee: Isuzu Motors Limited, Tokyo, Japan

[21] Appl. No.: 726,599

[22] Filed: Apr. 23, 1985

[30] Foreign Application Priority Data

May 26, 1984 [JP]  Japan .................................. 59-106869

[51] Int. Cl.⁴ .................. G05D 23/00; B60H 1/02; F02G 5/00
[52] U.S. Cl. ................. 237/2 A; 237/12.3 C; 123/551; 123/556
[58] Field of Search ............ 237/12.3 C, 12.3 A, 237/12.3 B, 12.3 R; 165/41; 123/550, 551, 556, 543

[56] References Cited

U.S. PATENT DOCUMENTS 2,191,177  2/1940  McCollum ..................... 237/12.3 C
2,198,875  4/1940  Karsel .............................. 237/12.3 C

FOREIGN PATENT DOCUMENTS 1961286  7/1971  Fed. Rep. of Germany ..... 237/12.3 C

Primary Examiner—Henry Bennett
Attorney, Agent, or Firm—Staas & Halsey

[57] ABSTRACT

A heater system associated with an engine is described having a burner disposed on an air intake tube of the engine for burning fuel, and a heat exchanger disposed downstream of the burner. The combusted gas produced by burning the fuel in the burner is introduced into the heat exchanger in which a heating medium such as air or engine cooling water is heated by the heat of the combusted gas. If the heating medium is air, then heated air is delivered by a blower into a passenger compartment to warm the same. If the heating medium is engine cooling water, then it is delivered to a heater core to warm the passenger compartment. The burner has a heater for heating the fuel to vaporize the same and an igniter for igniting the vaporized fuel. The heat exchanger is connected to a tubing serving as a passage for the heating medium, and directional control valves are disposed in the tubing for guiding the heating medium to flow through the heat exchanger or bypassing the heat exchanger.

5 Claims, 8 Drawing Figures

HEATER SYSTEM ASSOCIATED WITH ENGINE

BACKGROUND OF THE INVENTION

The present invention relates to a heater system associated with an engine, and more particularly to a heater system for quickly warming the passenger compartment of an automobile driven by an engine.

FIG. 1 of the accompanying drawings shows a conventional heater system for warming the passenger compartment of an automobile. The heater system operates by extracting cooling water from an engine 1 through hot water pipes 16 and circulating the water through a heater 30 composed of a heater core and a motor-driven blower for heating air and supplying the heated air into the passenger compartment. The heater system also includes defroster nozzles 32 coupled to the heater 30 and a control panel 31 electrically connected to the heater 30 to control the same.

There is also known a heater system which is independent of an engine and has a burner for combusting fuel to heat the passenger compartment with the generated heat.

In the heater system which utilizes the engine cooling water to warm the passenger compartment, the rate of temperature increase of the cooling water is so slow that it takes a certain time until the heater can discharge hot air. Therefore, the heater cannot perform its heating function during such a warm-up time.

The heater system which burns fuel independently of the engine requires a complex control mechanism for controlling the cycle of fuel combustion and a complex device for treating the exhaust gas. The heater system is therefore costly to manufacture, and also has the problem of environmental pollution.

SUMMARY OF THE INVENTION

It is an object of the present invention to provide a heater system associated with an engine, which is capable of producing warm air immediately after the engine has started to operate and while the engine cooling water remains low in temperature, and which requires no complex control mechanism and is free from the danger of environmental pollution.

To achieve the above object, a burner for burning fuel is disposed on an air intake pipe of an engine, and a heat exchanger is disposed on the air intake pipe downstream of the burner for recovering heat generated by the burner. The recovered heat is used as heat for warming a passenger compartment. The burner has a heater for heating the fuel to vaporize the same and an igniter for igniting and burning the fuel as vaporized by the heater. The heat exchanger has tubes for passage of a heating medium in order to recover the heat generated by the fuel combusted by the burner, the tubes being connected to directional control valves.

The heater system of the present invention can be used not only to warm the passenger compartment of an automobile, but also as a heater system for construction machinery such as a bulldozer or a crane, or other engine-driven machines.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 2:
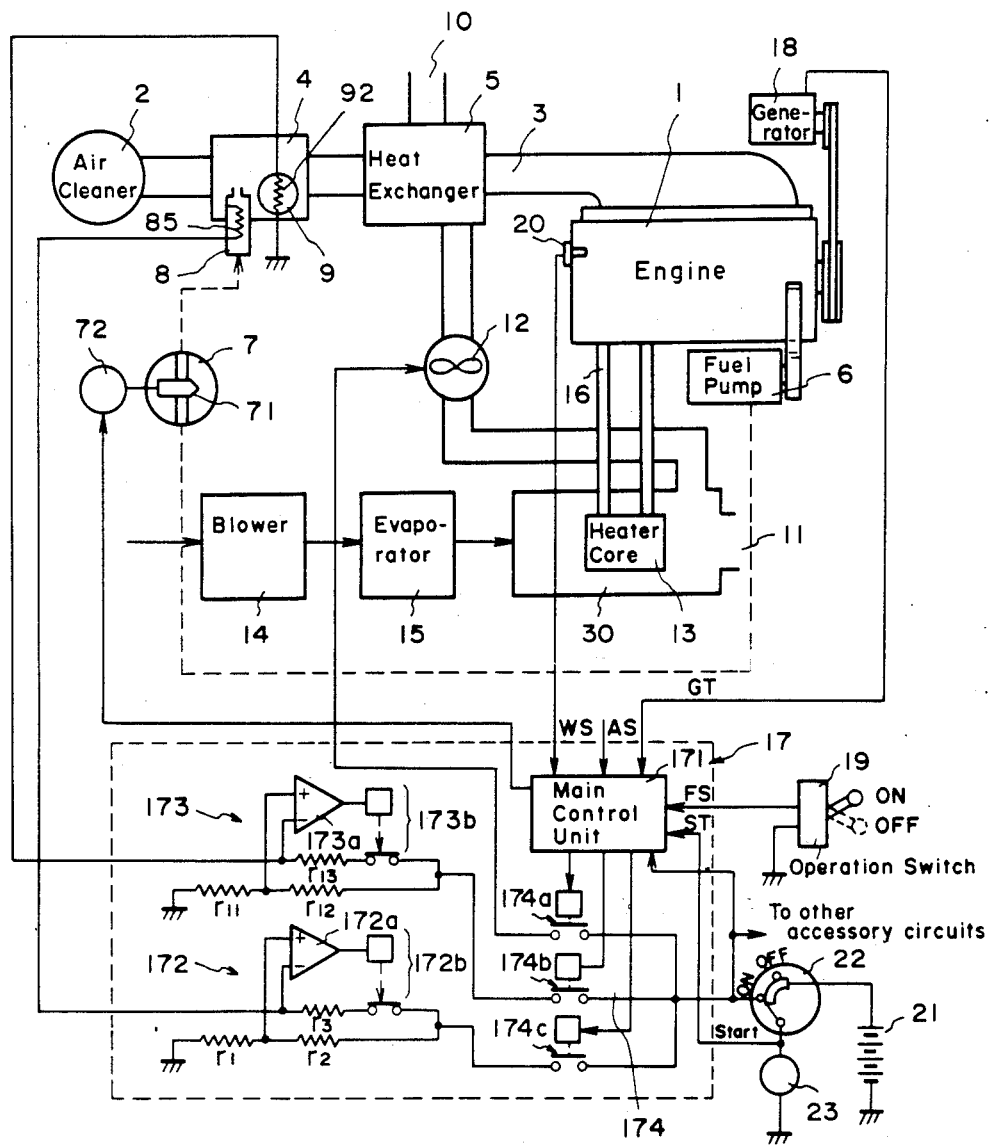
FIG. 2 is a block diagram of a heater system associated with an engine according to a first embodiment of the present invention.

FIG. 2 shows in block form a heater system associated with an engine according to a first embodiment of the present invention. A burner 4 and a heat exchanger 5 located downstream thereof are disposed on a pipe extending from an air cleaner 2 to an air intake pipe 3 of a diesel or gasoline engine 1. Although not shown in FIG. 2, it is well known in the art that when a diesel engine is employed, fuel for powering the engine is supplied thereto through an injection pump associated with the engine, and when a gasoline engine is employed, a carburetor is disposed in the air intake pipe 3 for supplying fuel to power the engine. The burner 4 is composed of a heater 8 for vaporizing fuel supplied through a fuel supply unit 7 from a fuel pump 6, and an igniter 9 for igniting the fuel as vaporized by the heater 8.

Figure 1:
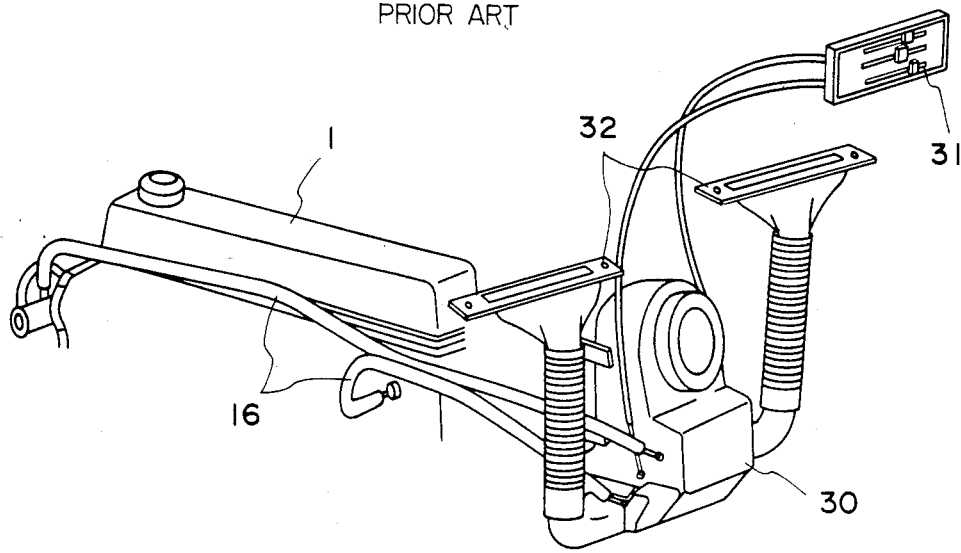
FIG. 1 is a perspective view of a conventional heater system utilizing hot water for an automobile.
Figure 3:
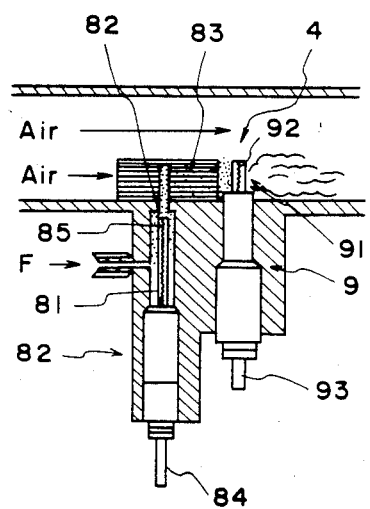
FIG. 3 is a cross-sectional view of a heater and an igniter in the heater system of the invention.

As shown in FIG. 3, the heater 8 has a heater element 81 for heating the fuel, a vaporizer 82 for vaporizing the fuel heated by the heater element 81 and supplying the vaporized fuel under pressure, a mixture generator 83 for mixing the vaporized fuel with air to produce a combustible air-fuel mixture, and a terminal 84 connected to the vaporizer 82. The heater element 81 has a resistance wire 85 of a positive temperature coefficient embedded therein. As illustrated in FIG. 2, the igniter 9 is disposed downstream of the heater 8 and has an igniter element 91 for igniting the atomized fuel. The igniter element 91 has a resistance wire 92 of a positive temperature coefficient embedded therein. A voltage is applied to the resistance wire 92 through a terminal 93. The fuel atomized by the heater 8 is mixed with air in the mixture generator 83, and the combustible air-fuel mixture is ignited by the igniter 9 into flames, the combusted gas of which is delivered to the heat exchanger 5.

The heat exchanger 5 introduces fresh air through an air inlet 10 communicating with the passenger compartment of an automobile which is desired to be warmed. The heat exchanger 5 also produces warm air by removing heat from the combusted gas. The produced warm air is delivered by a blower 12 to a warm air outlet 11, the blower 12 and the outlet 11 jointly constituting a heat radiator means. The outlet 11 opens at an outlet opening of a cooling water heater core 13 in a heater housing 30 provided separately for warming the passenger compartment.

Figure 4:
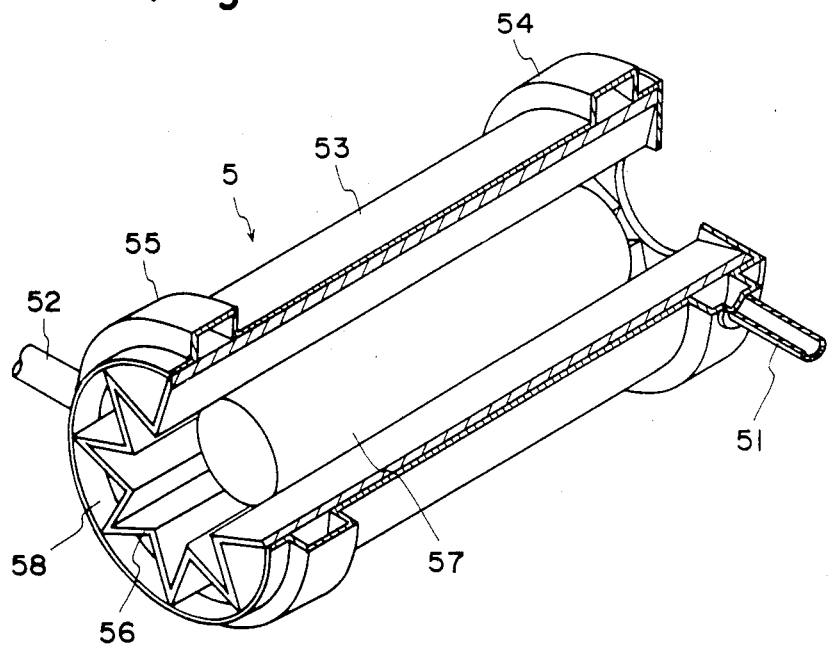
FIG. 4 is a perspective view, partly cut away, of a heat exchanger in the heater system of the invention.

FIG. 4 shows the internal construction of the heater exchanger 5 shown in FIG. 2. The heater exchanger 5 has a tubular casing 53 including larger-diameter annular flow paths 54, 55 near axially opposite ends thereof. The annular flow paths 54, 55 radially inwardly open into the casing 53 and are connected respectively to an inlet tube 51 and an outlet tube 52. The heat exchanger 5 also includes a heat exchanger cylinder 56 made, e.g., of stainless steel and disposed in the casing 53 to divide the interior thereof into an inner space and an outer space. The heat exchanger cylinder 56 has a plurality of radial wall fins to provide as wide a contact surface as possible for effective heat exchange between a medium flowing through the heat exchanger cylinder 56 and a medium flowing through a heating medium passage 58 between the heat exchanger cylinder 56 and the casing 53. A baffle rod 57 is disposed within the heat exchanger cylinder 56 axially between the annular flow paths 54, 55 for guiding the medium flowing through the heat exchanger cylinder 56 to flow on and along the inner wall surface of the heat exchanger cylinder 56.

Figure 5:
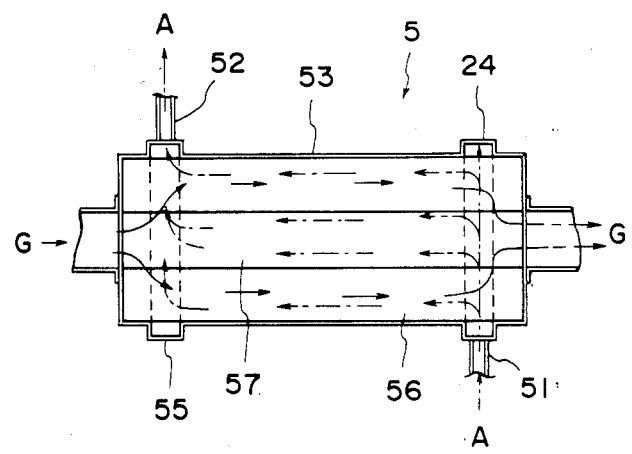
FIG. 5 is a cross-sectional view of the heat exchanger, showing the manner in which a heat exchanger medium flows in the heat exchanger.

FIG. 5 shows in cross section the heat exchanger 5 illustrated in FIG. 4, the view showing the manner in which the heat exchange mediums flow. The combusted gas G flowing from the burner 4 through the pipe into the heat exchanger 5 is dispersed and flows on and along the inner wall surface of the heat exchanger cylinder 56 in the direction of the solid-line arrows shown in FIG. 5. The air A for warming the passenger compartment flows from the inlet tube 51 into the annular flow path 54, is dispersed in the heating medium passage 58 between the casing 53 and the heat exchanger cylinder 56, and flows in the direction of the dotted-line arrows in FIG. 5, during which time heat is transferred from the gas G to the air A which is then heated.

Preferably, the outer surface of the casing 53 is covered with heat insulation to prevent heat radiation therefrom.

FIG. 2 also shows a blower 14, an air-conditioning evaporator 15, and a hot-water passage 16 which are members of a heater device utilizing engine cooling water. Therefore, the blower 14, the evaporator 15, and the hot-water passage 16 jointly constitute a heat radiator means using the engine cooling water as a thermal medium.

A controller 17 illustrated in FIG. 2 has a main control unit 171 supplied with an electric generation signal GT from a generator 18 driven by the engine 1, an on-off signal FS from an operation switch 19, a water-temperature signal WS from a water-temperature switch 20 for detecting the temperature of the engine cooling water, a start signal ST, and an accelerator signal AS. The controller 17 also includes a bridge circuit 172 for controlling the heater element 81 of the heater 8 to be heated to the temperature at which the fuel is vaporized, a bridge circuit 173 for keeping the igniter element 91 of the igniter 9 constantly at the temperature at which the air-fuel mixture is ignited, and a switch assembly 174.

The main control unit 171 is in the form of a computer having a processing unit, a memory, and an input/output interface.

The bridge circuit 172 comprises a Wheatstone bridge composed of the heating resistance wire 85 as one arm and resistors $r_1$ through $r_3$ as the other three arms, a comparator 172a for detecting the balancing condition of the Wheatstone bridge, and a relay 172b which is turned on when the output of the comparator 172a is positive and turned off when the comparator output is negative. The resistor $r_3$ has a resistance which is much smaller than the resistance of the resistance wire 85.

The bridge circuit 173 comprises a Wheatstone bridge composed of the heating resistance wire 92 as one arm and resistors $r_{11}$ through $r_{13}$ as the other three arms, a comparator 173a for detecting the balancing condition of the Wheatstone bridge, and a relay 173b which is turned on when the output of the comparator 173a is positive and turned off when the comparator output is negative. The resistor $r_{13}$ has a resistance which is much smaller than the resistance of the resistance wire 92.

The switch assembly 174 includes an on-off switch 174a for turning on and off the blower 12, an on-off switch 174b for controlling the supply of electric power to the bridge circuit 173, and an on-off switch 174c for controlling the supply of electric power to the bridge circuit 172. Denoted at 21 is a power supply battery, 22 a keyswitch for the engine, and 23 a starter motor.

Operation of the heater system of the aforesaid construction is as follows:

When the keyswitch 22 for the engine is turned on, the power supply for the automobile is switched on. Since the engine 1 is not started yet, however, the main control unit 171 maintains all of the on-off switches 174a through 174c off. Therefore, the heater system remains inactivated. When the keyswitch 22 is further turned to apply a voltage to the starter motor 23 to rotate the same, the engine 1 starts to operate. At the same time, the main control unit 171 turns on the on-off switches 174b, 174c to apply a voltage to the bridge circuits 172, 173. Then, voltages are applied to the heater 8 and the igniter 9 of the burner 4. Inasmuch as the temperatures of the resistance wires 85, 92 are low when the voltages are initially applied, their resistances are also low, and the outputs from the comparators 172a, 173a are positive, with the result that the relays 172b, 173b remain on. Thus, the voltages are continuously applied to the resistance wires 85, 92 which are quickly heated. When the temperatures of the resistance wires 85, 92 reach a prescribed level, their resistances also rise to a prescribed level. The voltages applied to the resistance wires 85, 92 are also increased to make the outputs of the comparators 172a, 173a negative. Therefore, the relays 172b, 173b are immediately turned off to stop the application of the voltages to the resistance wires 85, 92, which then start to be lowered in temperature. As the relays 172b, 173b are turned off, therefore, the outputs from the comparators 172a, 173a are rendered positive again. Then, the relays 172b, 173b are turned on again to heat the resistance wires 85, 92. The above cycle is repeated to keep the resistance wires 85, 92 at predetermined temperature levels. The predetermined temperature setting for the resistance wire 85 is about 500° C., while the predetermined temperature setting for the resistance wire 92 is about 900° C. These temperature settings are not limited to the given values, but may be varied by changing the resistance constants of the Wheatstone bridges so that the outputs of the comparators will be reversed at desired temperatures.

The time intervals at which the bridge circuits are turned on and off are primarily governed by the time intervals at which the contacts of the relays 172b, 173b are mechanically turned on and off. If the time intervals are to be increased, then the operation of the relays in the intervals from the turn-on state to the turn-off state should be given delay characteristics. The bridge circuits 172, 173 are not turned on and off at the same time, but are cyclically turned on and off independently of each other to keep the resistance wires 85, 92 at the desired temperatures.

At the same time that the heater 8 and the igniter 9 are kept at the prescribed temperatures, a fuel supply unit actuator 72 is actuated to open a fuel supply valve 71 in the fuel supply unit 7 to supply fuel to the heater 8. The supplied fuel is processed by the heater element 81, the vaporizer 82, and the mixture generator 83 into a combustible air-fuel mixture, which is ignited by the igniter 9 into flames that flow into the heat exchanger 5 positioned downstream of the burner 4.

The fuel supply valve 71 in the fuel supply unit 7 is opened and closed under the control of the fuel supply unit actuator 72 which comprises a step motor. The opening of the fuel supply valve 71 is controlled in a step-wise manner by the accelerator signal AS issued from an engine accelerator sensor (not shown). More specifically, when the accelerator pedal is depressed to the maximum depth, no fuel is supplied to the burner 4. When the accelerator pedal is depressed to a desired intermediate depth, the flow rate of fuel supplied to the burner 4 is about ¼ of the flow rate of fuel supplied in an engine idling mode.

When the engine enters a normal operation mode after the starting period thereof, the electric generation signal GT from the generator 18 and the on signal FS from the operation signal 19 are ANDed by the main control unit 171 through software implementation. The main control unit 171 then turns on the on-off switch 174a to enable the blower 12 to supply hot air. The air from the air inlet 10, as heated by the heat exchanger 5, is discharged as hot air from the warm air outlet 11 into the passenger compartment immediately after the engine has started operating.

Upon elapse of a certain period of time after the engine has started, and when the temperature of the engine cooling water is increased to the level at which the engine cooling water can be used to warm the passenger compartment, the water-temperature switch 20 attached to the engine 1 is energized to produce the water-temperature signal WS. The main control unit 171 then issues a command to the fuel supply unit actuator 72 to close the fuel supply valve 71 in the fuel supply unit 7. The main control unit 171 also stops the operation of the heater 8, the igniter 9, and the blower 12 associated with the heat exchanger 5, and starts to operate the blower 14 to enable the cooling-water heater device to start warming the passenger compartment.

If the engine 1 is started with the operation switch 19 off, then the electric generation signal GT from the generator 18 and the signal FS of the operation switch 19 are ANDed by the main control unit 171, which however does not turn on the on-off switch 174a, with the result that the blower 12 will not be operated. Nonetheless, a large quantity of air heated by the flames produced by the burner 4 is introduced into the engine 1, which can quickly be started even when it is cool as in winter. Therefore, the heater system of the invention serves also as a quick start system.

When the operation switch 19 is turned off while the heater system of the invention is in operation, the blower 12 is immediately stopped, and air heated by the burner 4 is delivered into the engine 1.

If the heater 8, the igniter 9, the blower 12 are to be operated simultaneously, rather than sequentially operated, then the switch assembly 174 may be composed of a single switch, and the operation switch 19 may be dispensed with. If the heater 8 and the igniter 9 are to be operated simultaneously, then the on-off switches 174b, 174c may be replaced with a single on-off switch.

Figure 6:
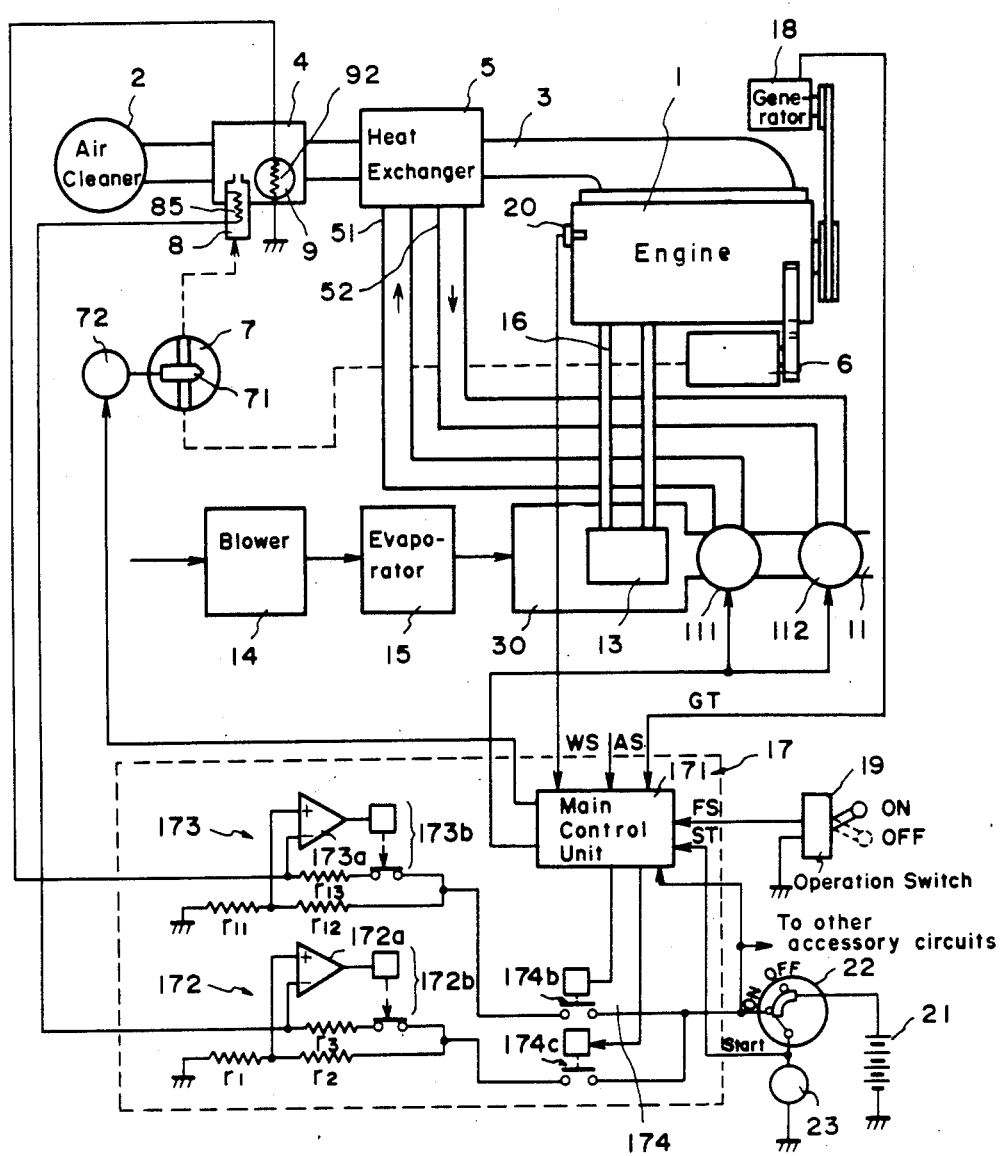
FIG. 6 is a block diagram of a heater system associated with an engine according to a second embodiment of the present invention.
Figure 7:
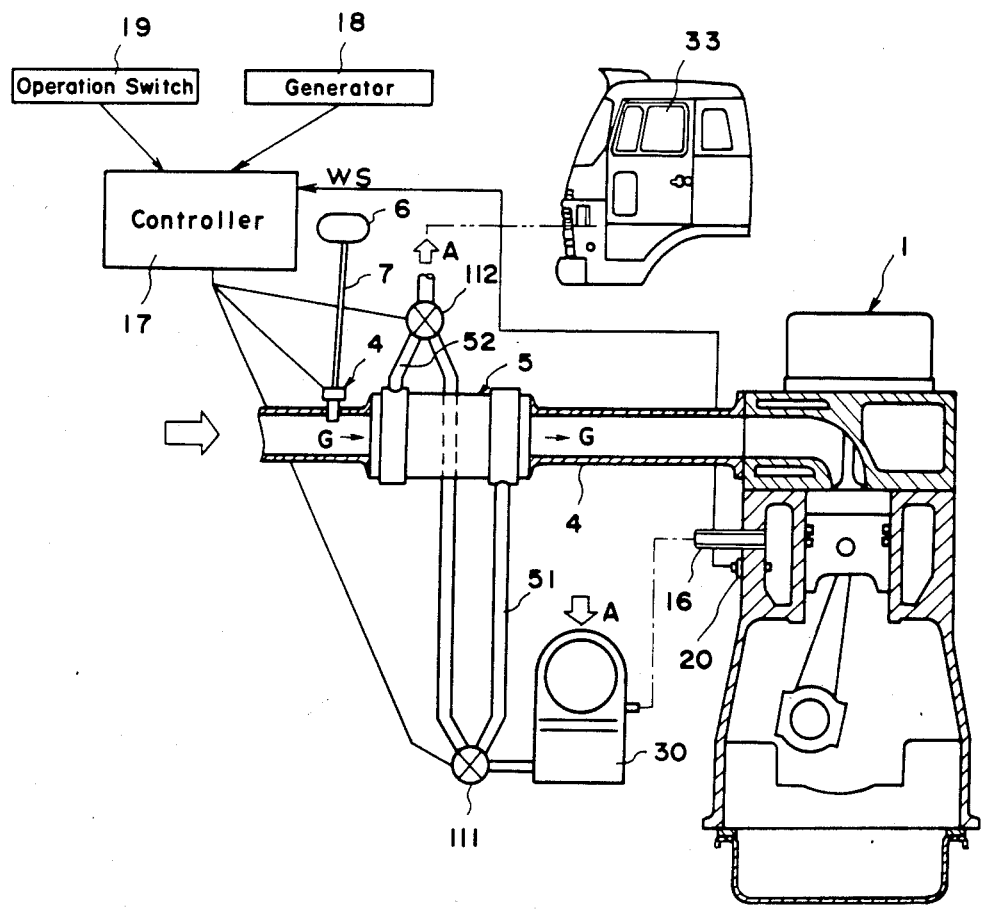
FIG. 7 is a cross-sectional view of a physical construction, partly in block form, of the heater system shown in FIG. 6.

FIG. 6 illustrates in block form a heater system associated with an engine according to a second embodiment of the present invention. Those parts in FIG. 6 which have the same constructions and functions as those of the parts of FIG. 2 are denoted by the same reference characters in FIG. 2. FIG. 7 shows structural details of the heater system of the second embodiment. The heater system of FIG. 6 includes three-port directional control valves 111, 112 disposed on the air passage extending from the outlet opening of the heater core 13 to the outlet 11. The directional control valves 111, 112 are connected respectively to the inlet tube 51 and outlet tube 52 of the heat exchanger 5. When the directional control valves 111, 112 are shifted toward the outlet 11, air from the heater core 13 is delivered out of the outlet 11. When the directional control valves 111, 112 are shifted for communication with the inlet tube 51 and the outlet tube 52, respectively, air from the heater core 13 is introduced through the directional control valve 111 and the inlet tube 51 into the heat exchanger 5 in which the air is heated, and the heated air is discharged through the outlet tube 52 and the directional control valve 112 to the outlet 11, from which the heated air is introduced into the passenger compartment to warm the same. The directional control valves 111, 112 are controlled by the main control unit 171 in response to the water-temperature signal WS from the water-temperature switch 20.

The heater system of the second embodiment operates as follows: While the engine cooling water is low in temperature and cannot be used to warm the passenger compartment after the engine 1 has started, the water-temperature signal WS is not generated by the water-temperature switch 20, and the main control unit 171 controls the directional control valves 111, 112 to communicate respectively with the inlet and outlet tubes 51, 52. Therefore, air from the heater core 13 is delivered via the heat exchanger 5 and the outlet 11 into the passenger compartment. During the passage of the air from the heater core 13 through the heat exchanger 5, the air is heated by the combusted gas emitted from the burner 4, and hence the hot air is discharged from the outlet 11 for warming the passenger compartment. When the temperature of the engine cooling water is increased to the level high enough to warm the passenger compartment upon elapse of a certain time after the engine 1 has started, the water-temperature sensor 20 is actuated to issue the water-temperature signal WS to the main control unit 171. The main control unit 171 then actuates the directional control valves 111, 112 to communicate with the outlet 11. Therefore, the air from the heater core 13 is sent through the directional control valves 111, 112 directly toward the outlet 11, without going through the heat exchanger 5. Since the air from the heater core 13 is sufficiently heated by the engine cooling water, it can warm the passenger compartment.

Figure 8:
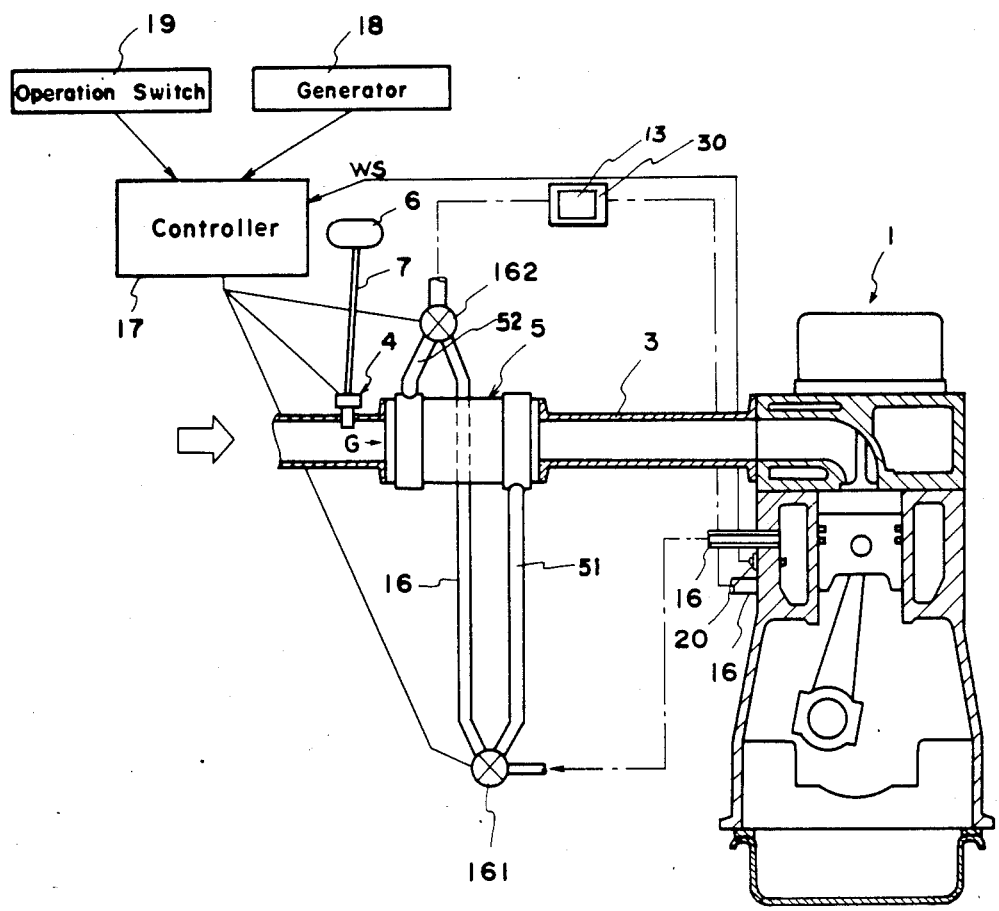
FIG. 8 is a a cross-sectional view of a physical construction, partly in block form, of a heater system according to a third embodiment of the present invention.

FIG. 8 illustrates structural details of a heater system according to a third embodiment of the present invention. Those parts in FIG. 8 which have the same constructions and functions as those of the parts of FIGS. 2, 6 and 7 are denoted by the same reference characters in FIGS. 2, 6 and 7.

Hot engine cooling water from the engine 1 is supplied to the heater housing 30 (shown in FIGS. 6 and 7) and returned to the engine 1 through the circulation passage, e.g., the hot water passage 16. The circulation passage has two three-port directional control valves 161, 162 for selectively directing the engine cooling water to the heat exchanger 5 to heat the engine cooling water with the thermal energy of the combusted gas from the burner 4. More specifically, the directional control valves 161, 162 are shifted to guide the engine cooling water as it circulates through the hot water passage 16, either along the first route from the engine 1 to the directional control valve 161 to the inlet tube 51 to the heat exchanger 5 to the outlet tube 52 to the directional control valve 162 to the heater core 13 to the engine 1, or along the second route from the engine 1 to the directional control valve 161 to the directional control valve 162 to the heater core 13 to the engine 1. When the engine cooling water flows through the first route, the engine cooling water is heated not only by the engine, but also by the heat exchanger 5. When the engine cooling water flows through the second route, it is heated only by the engine 1. As with the directional control valves 111, 112 of the second embodiment, the directional control valves 161, 162 are controlled by the controller 17 in response to the water-temperature signal WS from the water-temperature switch 20.

Therefore, when the temperature of the engine cooling water is too low to warm the passenger compartment, the directional control valves 161, 162 are shifted by the water-temperature signal WS, indicative of a low temperature, to cause the engine cooling water to flow through the first route. Then, the engine cooling water is sufficiently heated by the heat exchanger 5 and enters the heater core 13 for warming the passenger compartment.

When the engine cooling water is heated by the engine 1 up to the temperature high enough to warm the passenger compartment, the directional control valves 161, 162 are controlled by the water-temperature signal WS, representing an increased temperature, to cause the engine cooling water to flow through the second route. The engine cooling water now flows directly into the heater core 13, without going through the heat exchanger 5, to warm the passenger compartment.

The system of the present invention may be combined with an engine equipped with a supercharger. In such an application, the system operates as follows: When the temperature of intake air is abnormally increased due to the operation of the supercharger while the system of the invention is not used as a heater system as described above, cooling air can be delivered into the heat exchanger to cool the heated intake air. The cooling air discharged from the heat exchanger is discharged out of the engine system by a suitable means.

According to the present invention, as described above, the heater system associated with the engine has the burner and the heat exchanger on the air intake tube connected to the engine, so that heat generated by burning fuel in the burner is recovered by the heat exchanger and employed as a heat source for warming the passenger compartment. Therefore, the passenger compartment can quickly and effectively be heated right after the engine has started.

Since the heater system of the invention requires no control of cyclic periods of fuel combustion, the control mechanism used is simple. Inasmuch as the combusted gas emitted from the burner is introduced into the engine and is not directly discharged out of the engine system, no unburned gas is discharged from the heater system when the burner is turned on and off, and the exhaust gas emitted from the engine can be treated with ease.

Although certain preferred embodiments have been shown and described, it should be understood that many changes and modifications may be made therein thereto without departing from the scope of the appended claims.

What I claim:

1. A heater system disposed on an air intake pipe and located upstream of a fuel supply device for supplying fuel to an engine, comprising:
   (a) a fuel supply unit for supplying fuel to the heater system;
   (b) a burner disposed on the air intake pipe for burning the vaporized fuel by ignition to create heat, including
      (i) a heat for vaporizing the fuel supplied from the fuel supply unit;
      (ii) an igniter for igniting the fuel vaporized by the heater;
   (c) a heat exchanger disposed on the air intake pipe downsteam of the burner for recovering the heat generated by the burner; and
   (d) means for controlling the amount of fuel being supplied to the heater system by the fuel supply unit.

2. A heater system disposed on an air intake pipe and located upstream of a fuel supply device for supplying fuel to an engine, comprising:
   (a) a fuel supply unit for supplying fuel to the heater system;
   (b) a burner disposed on the air intake pipe for burning the vaporized fuel by ignition to create heat, including
      (i) a heater for vaporizing the fuel supplied from the fuel supply unit;
      (ii) an igniter for igniting the fuel vaporized by the heater;
   (c) a heat exchanger disposed on the air intake pipe downstream of the burner for recovering the heat generated by the burner;
   (d) means for controlling the amount of fuel being supplied to the heater system by the fuel supply unit; and
   (e) a blower for delivering air passing as a heating medium through the heat exchanger to radiate the heat of the heating medium.

3. A heater system disposed on an air intak pipe and located upstream of a fuel supply device for supplying fuel to an engine, comprising:
   (a) a fuel supply unit for supplying fuel to the heater system;
   (b) a burner disposed on the air intake pipe for burning the vaporized fuel by ignition to create heat, including
      (i) a heatdr for vaporizing the fuel supplied from the fuel supply unit;
      (ii) an igniter for igniting the fuel vaporized by the heater;

(c) a heat exchanger disposed on the air intake pipe downstream of the burner for recovering the heat generated by the burner;
(d) means for controlling the amount of fuel being supplied to the heater system by the fuel supply unit; and
(e) means for radiating the heat of cooling water passing through a heating medium through the heat exchanger.

4. A heater system disposed on an air intake pipe and located upstream of a fuel supply device for supplying fuel to an engine, comprising:
(a) a fuel supply unit for supplying fuel to the heater system;
(b) a burner disposed on the air intake pipe for burning the vaporized fuel by ignition to create heat, including
  (i) a heater for vaporizing the fuel supplied from the fuel supply unit;
  (ii) an igniter for igniting the fuel vaporized by the heater;
(c) a heat exchanger disposed on the air intake pipe downstream of the burner for recovering the heat generated by the burner;
(d) means for controlling the amount of fuel being supplied to the heater system by the fuel supply unit;
(e) a blower for delivering air passing as a heating medium through the heat exchanger to radiate the heat of the heating medium;
(f) cooling water radiating means for introducing the cooling water which conducts heat generated by the engine to use the heat as a heat source; and
(g) a controller having a water-temperature switch for changing over the operation of the cooling water radiating means and the blower dependent upon the temperature of the cooling water serving as a heat source.

5. A heater system disposed on an air intake pipe and located upstream of a fuel supply device for supplying fuel to an engine, comprising:
(a) a fuel supply unit for supplying fuel to the heater system;
(b) a burner disposed on the air intake pipe for burning the vaporized fuel by ignition to create heat, including
  (i) a heater for vaporizing the fuel supplied from the fuel supply unit;
  (ii) an igniter for igniting the fuel vaporized by the heater;
(c) a heat exchanger disposed on the air intake pipe downstream of the burner for recovering heat generated by the burner;
(d) means for supplying fuel to the burner;
(e) means for controlling the amount of the fuel being supplied to the burner by the fuel supply means;
(f) cooling water radiating means for introducing the cooling water which conducts heat generated by the engine to use the heat as a heat source;
(g) bypass means disposed on a hot water passage through which the cooling water is introduced into said radiating means for bypassing the cooling water serving as a heating medium to said heat exchanger; and
(h) means for changing over the bypass means to bypass the cooling water as a heating medium to the heat exchanger, when the temperature of the cooling water serving as a heat source is lower than a desired temperature, and not bypassing the cooling water serving as a heating medium to the heat exchanger, when the temperature of the cooling water serving as a heat source is higher than a desired temperature.

* * * * *

UNITED STATES PATENT AND TRADEMARK OFFICE
CERTIFICATE OF CORRECTION

PATENT NO. : 4,625,910

DATED : Dec. 2, 1986

INVENTOR(S) : Kawamura

It is certified that error appears in the above-identified patent and that said Letters Patent is hereby corrected as shown below:

Col. 8
Line 26, delete "heat" and insert --heater--;
Line 57, "intak" should be --intake--;
Line 65, delete "heatdr" and insert --heater--.

Signed and Sealed this

Seventeenth Day of March, 1987

Attest:

DONALD J. QUIGG

Attesting Officer

Commissioner of Patents and Trademarks